No. 651,020. Patented June 5, 1900.
W. ROMMEL & T. R. OWEN.
HITCHING FETTER FOR ANIMALS.
(Application filed Apr. 3, 1899.)
(No Model.)
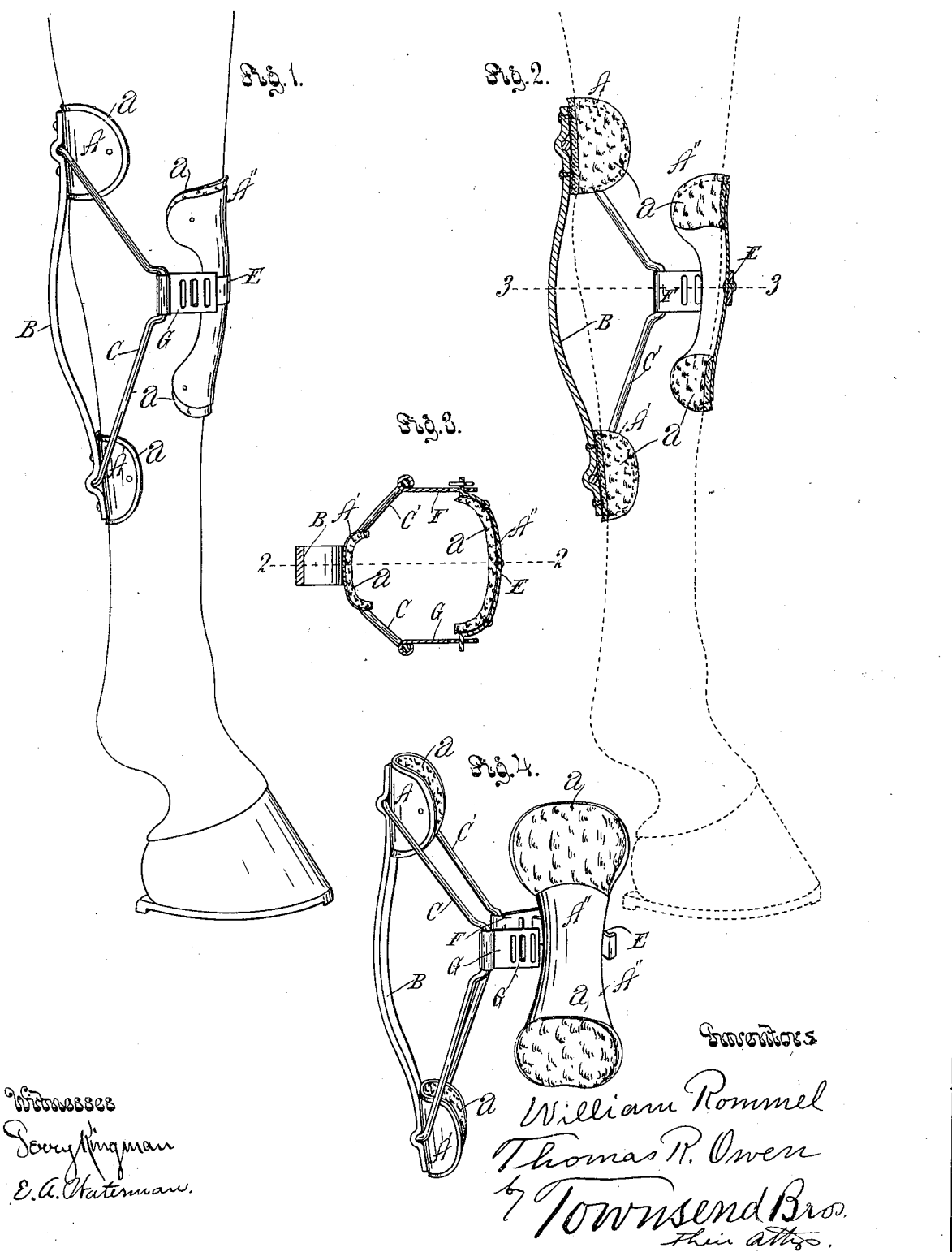
Witnesses
Inventors
William Rommel
Thomas R. Owen
by Townsend Bros.
their attys.

UNITED STATES PATENT OFFICE.

WILLIAM ROMMEL AND THOMAS R. OWEN, OF LOS ANGELES, CALIFORNIA.

HITCHING-FETTER FOR ANIMALS.

SPECIFICATION forming part of Letters Patent No. 651,020, dated June 5, 1900.

Application filed April 3, 1899. Serial No. 711,612. (No model.)

*To all whom it may concern:*

Be it known that we, WILLIAM ROMMEL and THOMAS R. OWEN, residing at Los Angeles, in the county of Los Angeles and State of California, have invented a new and useful Hitching-Fetter for Animals, of which the following is a specification.

This invention relates to that class of hitching-fetters which are applied to the leg of the animal to be hitched.

The object of our invention is to provide a fetter of this character which will be effective, light, simple and cheap of construction, and readily put on and taken off; also, to avoid any pressure upon the leg which would gall the animal or stop the circulation of the blood. Our fetter is so arranged that while the leg is in the standing position there is but slight pressure of the fetter upon the leg;
but when the animal attempts to bend the leg resistance is applied immediately upon the knee-cap, thus effectually preventing its bending.

The advantages to be gained by our fetter are as follows: It is very light, strong, and efficient. It is convenient to carry. It is readily and easily put on and taken off. It may be made entirely of metal and fastened with a lock and key, thus safeguarding the animal, while left, against thieves or meddlers. It does not heat the leg nor impede circulation. It does not chafe or worry the animal on which it is placed. It avoids the necessity of hitching-posts, weights, straps, or halters. It prevents an animal on which it is used from standing upon the curbing or sidewalk. It absolutely prevents the animal on which it is used from running away no matter how badly frightened.

The accompanying drawings illustrate our invention.

Figure 1 is a perspective view showing our newly-invented fetter applied to the leg of a horse. Fig. 2 is a vertical mid-section on line 2 2, Fig. 3, with a dotted outline of the leg. Fig. 3 is a plan section on line 3 3, Fig. 2. Fig. 4 is a perspective view of the fetter removed and partially opened.

We preferably provide a skeleton frame, as shown in the drawings, with upper and lower rear plates or pads to engage the rear of the leg and hinge a knee-plate thereto, with pads on the knee-plate at less distance apart than the rear pads to engage the leg at the knee above and below the knee-joint. The knee-plate does not touch the knee except when the animal tries to bend his leg. The frame may be made in various ways. In the drawings we have shown a form which we deem preferable, but we do not limit our invention to any specific form.

The nature of our invention consists in an improved fetter or device for preventing an animal from bending one of its fore legs, such fetters being effective, because an animal cannot walk and greatly dislikes to move unless it has the use of both fore legs.

Our fetter, without chafing or fretting the animal at all, holds the leg rigid and prevents any action of the knee.

In our fetter we provide two shields or resistance-plates A A', of metal or other suitable material, made to fit snugly to the back part of the fore leg about six inches above and six inches below the knee-joint, respectively, and to give them a better hold on the hide and for the comfort of the animal they may be padded, preferably with sheepskin a, having the wool on next to the leg. The object of these shields is to offer the greatest resistance with the least chafing and annoyance to any pressure that may be exerted by the animal in its attempt to bend the fore leg. These shields are separated from each other and kept apart at a uniform distance by a rigid connection B, of metal, wood, or other suitable substance of any shape or design desired. They are jointed or connected on either side of the leg one with the other by longitudinal connections C C', sufficiently strong to resist any strain that may be placed upon them by the animal in attempting to bend his fore leg at the knee. Said connections may be either rigid, as of heavy wire, or flexible, as of chain, cord, or strap, and may be of any material of sufficient strength. The connections between the shields are so long that a point near the middle of the connections will reach to or nearly to the knee-cap of the animal. When the connection is extended for the purpose of being fastened, the connection, whether rigid or flexible, will when extended for the purpose of fastening the fetter on the leg form a truss with obtuse angle having its apex opposite the knee-joint. In case the connections C are rigid they prevent flexure to such a degree as to allow the bar B to be dispensed with without destroying the usefulness of the fetter. We also provide a third shield or resistance-plate A″, made of metal or other suitable material, about six inches long and about three inches wide, made to conform to the knee-cap and the leg above and below the knee-joint, the upper part of this shield or knee-plate being wider than the lower part, the material being cut away below the top to leave on each side a lateral prolongation a″ of the upper part of the shield, which is bent backward, so as to engage and fit the leg snugly above the enlargements of the knee above the joint, and thus when aided by the resistance-plates A A′ at the back of the leg, as above described, prevents the fetter from falling off or from dropping below the knee. This knee-plate is padded, preferably with sheepskin a with the wool on, above and below the knee-cap, just enough to keep pressure off the knee-cap so long as the leg remains in an upright position and the animal remains quiet. At right angles with the animal's leg and midway of said knee-plate is a reinforcement or rigid cross-bar E, of metal or other material sufficiently strong to withstand all strain that the animal may cause by attempting to bend its knee. The bar may be riveted or otherwise fastened on the top of said knee-plate and is sufficiently long for the ends to project far enough on each side of the leg at the knee to engage the connections between the resistance-plates A A′ on both sides of the leg and fastened to said connections by suitable devices on each side. One end of this cross-bar is permanently fastened to one of said connections between the two rear shields, about midway, by means of a hinge F, which allows the knee-plate to be folded back and forth easily, so that it may be fastened on the opposite side of the knee, with the other connection between said resistance-plates, by means of a catch or fastening of suitable design, as at G, which enables the fetter to be put on or taken off at will.

Now, having described our invention, what we claim as new, and desire to secure by Letters Patent, is—

1. A hitching-fetter comprising three resistance-plates or shields, two for the back of the fore leg and one for the front of the fore leg; these three plates connected by rigid connections running longitudinally from one of the rear plates to the other rear plate and bent forward intermediately, and extending diagonally from the rear plates to a point opposite the knee-joint and passing on each side of the leg; and a bar fastened at its ends to said intermediate bends respectively and being attached to and at right angles with the knee-plate.

2. A hitching-fetter, comprising three resistance-plates or shields, two for the back of the fore leg, and one for the front of the fore leg; these three plates connected by connections running longitudinally from one of the rear plates to the other rear plate, and diagonally from the rear plates to a point opposite the knee-joint and passing on each side of the leg; and suitable means connecting the said connections respectively with the opposite sides of the knee-plate.

3. The hitching-fetter comprising the rear resistance-plates connected together rigidly to engage the leg above and below the knee-joint; the knee-cap plate widened at the top and provided with padding at top and bottom to hold the middle of the plate away from the knee-cap; and connections connecting the middle of the knee-cap plate with the rear resistance-plates.

4. A hitching-fetter comprising two rear resistance-plates; a rod connecting said plates together to apply the plates above and below the knee-joint; a knee-cap plate; connections extending forward from the rear resistance-plates on opposite sides thereof; a hinge connecting the knee-cap plate with one of said connections; and a latch connecting the knee-cap plate with the other of said connections.

WILLIAM ROMMEL.
THOMAS R. OWEN.

Witnesses:
JAMES R. TOWNSEND,
F. M. TOWNSEND.